US009592805B2

(12) United States Patent
Rudberg et al.

(10) Patent No.: US 9,592,805 B2
(45) Date of Patent: Mar. 14, 2017

(54) METHOD AND SYSTEM FOR CONTROL OF AUXILIARY BRAKES

(71) Applicant: SCANIA CV AB, Södertälje (SE)

(72) Inventors: Arvid Rudberg, Stockholm (SE); Tomas Selling, Johanneshov (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/897,830

(22) PCT Filed: Jun. 17, 2014

(86) PCT No.: PCT/SE2014/050735
§ 371 (c)(1),
(2) Date: Dec. 11, 2015

(87) PCT Pub. No.: WO2014/209201
PCT Pub. Date: Dec. 31, 2014

(65) Prior Publication Data
US 2016/0137179 A1    May 19, 2016

(30) Foreign Application Priority Data

Jun. 27, 2013  (SE) ...................................... 1350781

(51) Int. Cl.
*B60T 7/12*  (2006.01)
*B60T 8/32*  (2006.01)
(Continued)

(52) U.S. Cl.
CPC .............. *B60T 8/3215* (2013.01); *B60T 7/22* (2013.01); *B60T 8/1761* (2013.01); *B60T 10/02* (2013.01); *B60T 17/22* (2013.01); *B60T 2201/04* (2013.01)

(58) Field of Classification Search
CPC .... B60T 10/184; B60T 10/196; B60T 10/198; B60T 7/02
(Continued)

(56) References Cited

U.S. PATENT DOCUMENTS 6,421,598 B1 * 7/2002 Oshiro ................ B60T 8/17616
188/2 R
8,126,614 B2 * 2/2012 Karlsson ............. B60T 8/17616
701/48
(Continued)

FOREIGN PATENT DOCUMENTS

WO   WO 2007/030073 A1   3/2007
WO   WO 2007/139488 A1   12/2007

OTHER PUBLICATIONS

International Search Report dated Oct. 2, 2014 issued in corresponding International patent application No. PCT/SE2014/050735.
(Continued)

*Primary Examiner* — Thomas G Black
*Assistant Examiner* — Luke Huynh
(74) *Attorney, Agent, or Firm* — Ostrolenk Faber LLP

(57) ABSTRACT

A method and a system to control an auxiliary brake system in a vehicle 100 having a service brake system 150 and an auxiliary brake system 160. Also a system for prevention of wheel lock when braking, which may deactivate a braking action provided by the auxiliary brake system 160 and may actively control a braking action provided by the service brake system 150. The system determines whether the vehicle 100 is in a driving mode for which it is acceptable in terms of safety and/or drivability to block the deactivation of the braking action for the auxiliary brake system 160. If a first manual control 170, which is set up solely for activating braking action for the auxiliary brake system 160, is activated, this means it is acceptable, from a safety and/or drivability point of view, for the driving mode in question, (Continued)

Figure 1:
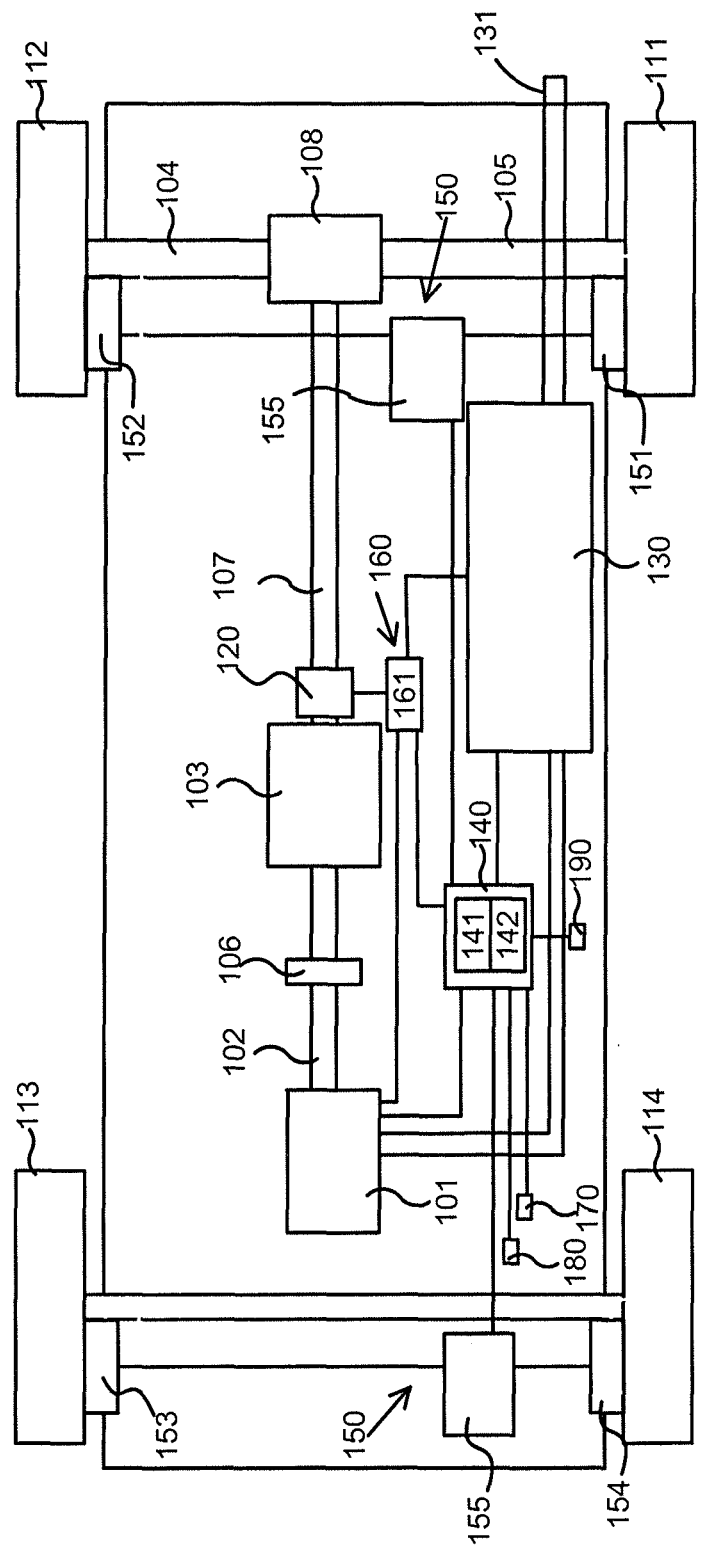

to block the deactivation. Also arranging block deactivation for the auxiliary brake system 160 if it is acceptable in terms of safety and drivability to block it.

16 Claims, 3 Drawing Sheets

(51) Int. Cl.
  *B60T 7/22* (2006.01)
  *B60T 10/02* (2006.01)
  *B60T 17/22* (2006.01)
  *B60T 8/1761* (2006.01)

(58) Field of Classification Search
  USPC ............. 701/71, 48, 51, 82; 180/338, 347
  See application file for complete search history.

(56) References Cited

U.S. PATENT DOCUMENTS

| | | | |
|---|---|---|---|
| 2005/0052075 A1* | 3/2005 | Sabelstrom | B60T 10/02 303/3 |
| 2008/0082244 A1* | 4/2008 | Watanabe | B60T 1/14 701/71 |
| 2008/0257656 A1* | 10/2008 | Skinner | B60T 7/20 188/1.11 E |
| 2009/0138169 A1 | 5/2009 | Uematsu | |

OTHER PUBLICATIONS

International Preliminary Report on Patentability dated Oct. 2, 2014 issued in corresponding International patent application No. PCT/SE2014/050735.

* cited by examiner

METHOD AND SYSTEM FOR CONTROL OF AUXILIARY BRAKES

CROSS-REFERENCE TO RELATED APPLICATIONS

The present application is a 35 U.S.C. §§371 national phase conversion of PCT/SE2014/050735, filed Jun. 17, 2014, which claims priority of Swedish Patent Application No. 1350781-9, filed Jun. 27, 2013, the contents of which are incorporated by reference herein. The PCT International Application was published in the English language.

TECHNICAL FIELD

The present invention pertains to a method for controlling an auxiliary brake system, to a system for control of an auxiliary brake system and a computer program and a computer program product, which implement the method according to the invention.

TECHNICAL BACKGROUND

The following background description constitutes a description of the background of the present invention, and need not necessarily constitute prior art.

Many vehicles, e.g. heavy goods vehicles such as buses, trucks, loaders and mining vehicles, are today equipped with systems for both service braking and auxiliary braking. The service brake system typically uses traditional disc brakes and/or drum brakes placed at the vehicle's wheels. The service brake system is used as the vehicle's principal brake system, e.g. braking the vehicle while it is driven. The service brakes provide a very large braking force. However, the service brakes may overheat in case of a longer period of braking, e.g. on long downhill slopes.

The auxiliary brakes may use braking devices which act on the driveline, e.g. a retarder, exhaust braking or engine braking. The auxiliary brakes may e.g. be used when a sustained braking over a long period of time and with no risk of overheating is required. Thus, auxiliary brakes may e.g. be used when braking on long downhill slopes and/or by systems for constant cruise control, where braking is often used during longer periods.

Auxiliary brakes may also be used to relieve the service brake system and thus to reduce wear and tear and service costs for the service brake system. Therefore, auxiliary brakes may often be used at the same time as the service brakes, e.g. in case of brake pedal braking. Auxiliary braking may also be used by different types of cruise controls to avoid that speed limits are exceeded.

In case of auxiliary braking by engine braking, also called dragging, the engine is driven to rotate since the vehicle rolls forward over the road section, while no fuel is supplied to the engine. Internal resistance in the engine that occurs when it is driven to rotate by the rolling, where the internal resistances arise e.g. in case of compressions in the cylinders and due to frictions in the engine, applies a braking force to the driveline during engine braking.

Reinforced engine braking may be obtained by so-called decompression braking, where valves in the cylinders are opened every time the pistons in the cylinders are in the final phase of compression. Decompression braking is thus a method to increase the engine's braking torque at dragging.

Reinforced engine braking may also be obtained by way of so-called exhaust braking. In such auxiliary braking by exhaust braking, one or several dampers in the exhaust treatment system are controlled, which means that the exhaust back pressure increases so that an increased braking action is achieved during dragging. The exhaust treatment system here comprises exhaust pipes in which the exhaust is led from the engine to an exhaust purifying devices in the exhaust treatment system, e.g. oxidation catalysts, filters and/or reduction catalysts. The one or several dampers which are controlled may in this instance e.g. be placed downstream of the manifold and relatively near the manifold. Exhaust braking is thus a method to increase the engine's braking torque during dragging.

In auxiliary braking through a retarder, a rotor is set into motion by the driveline, usually by an output shaft from the gearbox. The retarder also comprises a stator, and a space between the stator and the rotor which may be filled with e.g. oil. The braking force for the retarder is controlled by way of a regulation of the oil pressure in the retarder, so that the braking force increases with an increasing oil pressure. Here, the braking force also acts on the driveline.

BRIEF DESCRIPTION OF THE INVENTION

One feature of auxiliary brake systems is that the braking force is only applied to the driving wheels in the vehicle, since the auxiliary brakes act on the vehicle's driveline. This differs from the service brake system, where the braking force is applied to more wheels, and not only to the driving wheels.

This means that powerful braking with the use of the auxiliary brakes provides a powerful braking torque only to the driving wheels, so that there is a great risk of the vehicle skidding when driving on a slippery surface. This situation may e.g. be compared with, on a slippery road, pulling the handbrake in a vehicle with a hand brake which acts only on the rear wheels, which often leads to more or less uncontrolled skidding.

In other words, braking with auxiliary brakes may give rise to problems related to the vehicle's lateral stability in case of large wheel slips. A wheel slip is defined in this document as a difference between a measured rotational speed for a wheel and the rotational speed which the wheel should have had if it had rolled with the vehicle without any resistance. If the wheel slips on the surface, for example, there is such a difference and thus also a wheel slip.

Wheel slips may arise if the friction between a driving wheel and the surface on which the wheel is rolling is smaller than the braking force, which an auxiliary brake applies to the driving wheel. If the auxiliary brake is then allowed to continue to apply a braking force to the driving wheel, problems in lateral stability may arise for the vehicle in the form of skidding.

Also, in situations where the driving wheel to which the auxiliary brake is applied looses contact with the surface, e.g. in case of roughness or bumps on the surface, relatively large wheel slips may arise. The driving wheel will then be locked by the service brake and/or the auxiliary brake, since the driving wheel loses contact with the surface.

In order to avoid skidding, today's vehicles are often equipped with a system for prevention of wheel lock when braking, i.e. with a so-called ABS system (Anti-lock Braking System), which may carry out an active control of the braking action provided by the service brake system, and may deactivate the braking action provided by the auxiliary brake system. According to laws and/or regulations in many countries, heavier vehicles, such as buses, trucks, mining vehicles or similar, may not be driven on public roads unless they are equipped with a functioning ABS system.

The ABS system thus achieves active control of the braking action of the service brake system, where this active control is devised to provide as great a braking action as possible without too great a wheel slip arising. During this active control of the braking action of the service brake system, the braking action provided through the service brake system may temporarily, and during short periods of time $T_{ABS}$, be deactivated. Thus wheel slips are reduced, and therefore also the risk of skidding.

The ABS system will, in case of a wheel slip, request disconnection of the auxiliary braking, i.e. a total deactivation of the braking action provided by the auxiliary brake system during a time period $T_{ABS\_aux}$, in order to counteract skidding. Auxiliary brakes are generally relatively slow, and also difficult to control/steer with high precision. Therefore, the ABS system requests total disconnection of the auxiliary braking during the time period $T_{ABS\_aux}$ when a risk of skidding exists, where this time period $T_{ABS\_aux}$ is typically considerably longer than the time period $T_{ABS}$ for deactivation of the service braking during the active control of the service brake system. In this document, this total disconnection/deactivation of the auxiliary braking is also mentioned in the form that the braking action provided via the auxiliary brake system may be deactivated.

The ABS system's disconnection/deactivation of the auxiliary braking, in case of a risk of skidding, is both good and necessary for a majority of the driving modes in case of normal driving.

In certain driving modes this disconnection/deactivation may, however, be irritating to a driver and may also be dangerous. Such driving modes may comprise driving on slippery roads/surfaces and/or driving on rough/bumpy roads/surfaces. One example of vehicles subjected to such driving modes comprising slippery and/or rough roads/surfaces is vehicles in mining. In mines the walls (if there are walls) or surfaces on which the vehicles are driven are often rough and/or slippery. Other examples of vehicles which are often subjected to such driving modes are forest machines, tractors, and snow-removing machines.

Examples of a couple of problems for vehicles in mining are set out below. Similar problems may, however, also arise for substantially all types of vehicles that are driven on slippery and/or rough roads/surfaces, e.g. timber trucks on forest roads, tractors travelling outside the road network or snow-removing vehicles.

When vehicles in mining are driven on mining roads with roughness/bumps in the road, the driving wheels relatively often risk losing contact with the surface, or at least risk getting a low friction between the driving wheels and the road, especially when the vehicle descends into the mine unloaded, since the vehicle on the way down is typically considerably lighter than on the way up.

In mining it is desirable that a large part of the braking of the vehicle is carried out with auxiliary brakes. The high usage of the auxiliary braking means that the wear of the service brake system is minimized. Additionally, the use of auxiliary braking means that overheating of the service brake system, e.g. overheating of braking discs and other important components in the service brake system, may be avoided. Thus, the use of auxiliary braking ensures that a sufficient braking force is available via the service brake system when a powerful braking occurs, at the same time as costs related to wear of the service brake system are reduced.

Thus, a driver typically uses only one or several auxiliary brakes, e.g. a retarder on a normal trip down into the mine, e.g. by way of activation of a retarder lever. The service brakes are not used at all during such trips down into the mine. Here, the service brakes are thus used only if powerful braking is required, e.g. if the vehicle risks colliding with a mountain wall, staff or another vehicle.

The ABS system monitors the wheel slip, as described above. When the friction becomes too low, or when the contact between the driving wheels and the surface is lost entirely, the ABS system reacts and disconnects/deactivates the auxiliary brake system. When the auxiliary brake system is deactivated by the ABS system, the vehicle is in a situation where there is no braking action at all in the vehicle, since the auxiliary brake system is deactivated and the service brake system is not used. Thus, a total loss of braking action in the vehicle arises.

Situations without braking action in the vehicle are naturally both uncomfortable and dangerous for the driver of the vehicle, and may be damaging for the vehicle itself. Especially in mining, where galleries are often narrow and curvy, with mountain walls and/or precipices next to the galleries, this may be very unpleasant and/or dangerous for the driver.

Situations without braking action in the vehicle may also become relatively long, which is e.g. due to the fact that a retarder uses a relatively long time to build up a braking force after the ABS system has deactivated the retarder's braking action.

Thus, vehicles driven on slippery and/or rough surfaces relatively often risk ending up in situations where the vehicle lacks a braking ability, which is naturally highly unsuitable and even dangerous to both the driver, the surrounding environment and the vehicle itself. In addition, situations without braking force are perceived as very unpleasant to a driver of these vehicles.

It is therefore one objective of the present invention to provide a method and a system for control of an auxiliary brake system, which at least partly solve these problems.

According to the present invention, a method and a system for control of an auxiliary brake system in a vehicle comprising a service brake system and an auxiliary system is presented. The vehicle also comprises a system for prevention of wheel lock in case of braking, which may deactivate a braking action provided by an auxiliary brake system, and may actively control the braking action provided by the service brake system, i.e. an ABS system, for example.

The system according to the present invention is arranged to determine whether the vehicle is in a driving mode for which it is acceptable in terms of safety and/or drivability to block the deactivation of the braking action for the auxiliary brake system. Such a driving mode may e.g. arise if the driver has activated a first manual control for activation of the auxiliary brake system, and has not activated a second manual control devised for the activation of the service brake system. The system is also arranged to block the deactivation of the auxiliary brake system if the determination shows that it is acceptable in terms of safety and drivability to block the deactivation of this braking action.

In other words, the system carries out an intelligent and systematic determination of whether a blocking of the ABS functions with regard to the auxiliary brake system is acceptable in terms of safety and/or drivability. Subsequently, the blocking is carried out if it has been deemed to be acceptable/suitable.

If the vehicle ends up in a driving situation for which it is no longer acceptable in terms of safety and/or drivability to block the ABS functions with respect to the auxiliary brake system, the ABS function is allowed again. Such a driving situation may arise e.g. if the driver activates a second manual control devised for the activation of the service brake system.

Thus, through the present invention, periods without braking action in the vehicle may be avoided, since the ABS system's function may be blocked in a controlled manner with respect to the auxiliary brakes, if it is deemed suitable. This means that e.g. vehicles in mining are not subjected to periods during which the vehicle entirely lacks braking action, since it will be possible to use the auxiliary brakes to brake the vehicle, even if the mining roads are slippery and rough/bumpy. An increased safety for the driver and the vehicle is thus obtained. In addition, the driver's comfort is increased considerably, since situations that are very stressful to the driver and which have arisen in prior art systems, when the vehicle lacked a braking action, may be avoided.

When the blocking of the ABS function with respect to the auxiliary brake system is determined to be unacceptable in terms of safety and/or drivability, e.g. if the driver depresses the service brake pedal, the blocking will not be carried out (or will be interrupted if the blocking is ongoing). This means that the driver may use braking with ABS-controlled braking, both for the auxiliary brake and the service brake systems, so that a maximum braking action without any risk of skidding and/or wheel lock is obtained.

With prior art solutions, certain drivers of vehicles which are used in e.g. mining have discovered that it is possible to manually dismantle an ABS speed sensor at a wheel, which means that the ABS system discovers that there is an error in the system and therefore the auxiliary brake system is automatically degraded, so that it does not permit the ABS system to deactivate it. However, such a removal of an ABS speed sensor has a highly negative impact on the vehicle's safety, since no ABS function will be available at all for the wheel where the ABS speed sensor has been dismantled. Thus, this removal of the ABS speed sensor causes a very poor ABS function also for the service brake system, which is highly unsuitable. Additionally, in many countries driving on a public road without a well-functioning ABS system is not permitted.

The ABS speed sensor normally also provides speed information to the vehicle's control system. When this speed information is lacking, because the sensor has been dismantled, the vehicle's control system receives less complete speed information to base its results on. This means that various controls of different systems in the vehicle risk becoming less accurate, which may e.g. result in higher fuel consumption and/or greater wear of vehicle parts.

Thanks to the present invention, a systematic and to the driver intuitively intelligible blocking of the ABS system may be obtained instead, which is implemented in the vehicle's control system. This means that the blocking of the ABS system may be achieved when it is acceptable/suitable, without any special solutions required, e.g. in the form of dismantling of a speed sensor.

According to one embodiment of the present invention, the determination of whether a driving mode exists, for which it is acceptable in terms of safety and/or drivability to block the ABS system for the auxiliary brake system, is based on at least one input made by a driver.

Such an input may e.g. be obtained by using one or several manual controls devised to receive inputs. This manual control may consist of a first manual control, devised only for activation of a braking action for the auxiliary brake system, e.g. a manual control for retarder braking or exhaust braking. When this first manual control devised for activation of only auxiliary braking is activated, the input is interpreted to mean that the ABS system may be blocked with respect to the auxiliary brake system. This provides an intuitively intelligible and correct function for the ABS system which may easily be accepted by the driver, since the function means that the auxiliary braking is always available without interruptions, if the driver him-/herself has made inputs which indicate that auxiliary braking is desirable.

If the driver, however, e.g. depresses a braking pedal for the service brake system, or activates another input element intended for activation of the service brake system, it is deemed unsuitable to block the ABS system with regard to the auxiliary braking. Thus, according to one embodiment of the present invention, the ABS system is permitted to control the braking action for both the service brake system and the auxiliary brake system, in order to achieve maximum braking action without skidding if e.g. the service brake pedal is depressed by the driver. The driver is thus permitted to assess whether there is a risk of skidding and/or wheel lock as long as the second manual control set up for the activation of the service brake system is not activated, while the ABS system takes over the assessment of the risk of skidding and/or wheel lock for the vehicle, if the second manual control set up for the activation of the service brake system has been activated.

According to one embodiment, the system according to the present invention comprises an indicator which indicates that control according to the present invention is carried out. The indicator is suitably placed in a driver interface and activated at the start of the vehicle's engine and/or during driving, so that the driver is always notified of the vehicle's configuration with respect to the ABS function for the auxiliary brake system. This minimizes the risk of the driver being surprised by the fact that the ABS function is switched off/blocked for the auxiliary brake system, since the fact that the ABS function is switched off is indicated each time the vehicle is started. In case of ownership changes, the risk of the new owner being ignorant of the control of the ABS system with respect to the auxiliary brakes according to the invention is also minimized, since the switched off/blocked ABS function is indicated already the first time the vehicle is started following the ownership change, and may also be indicated each time the vehicle is started thereafter.

BRIEF LIST OF FIGURES

Figure 2:
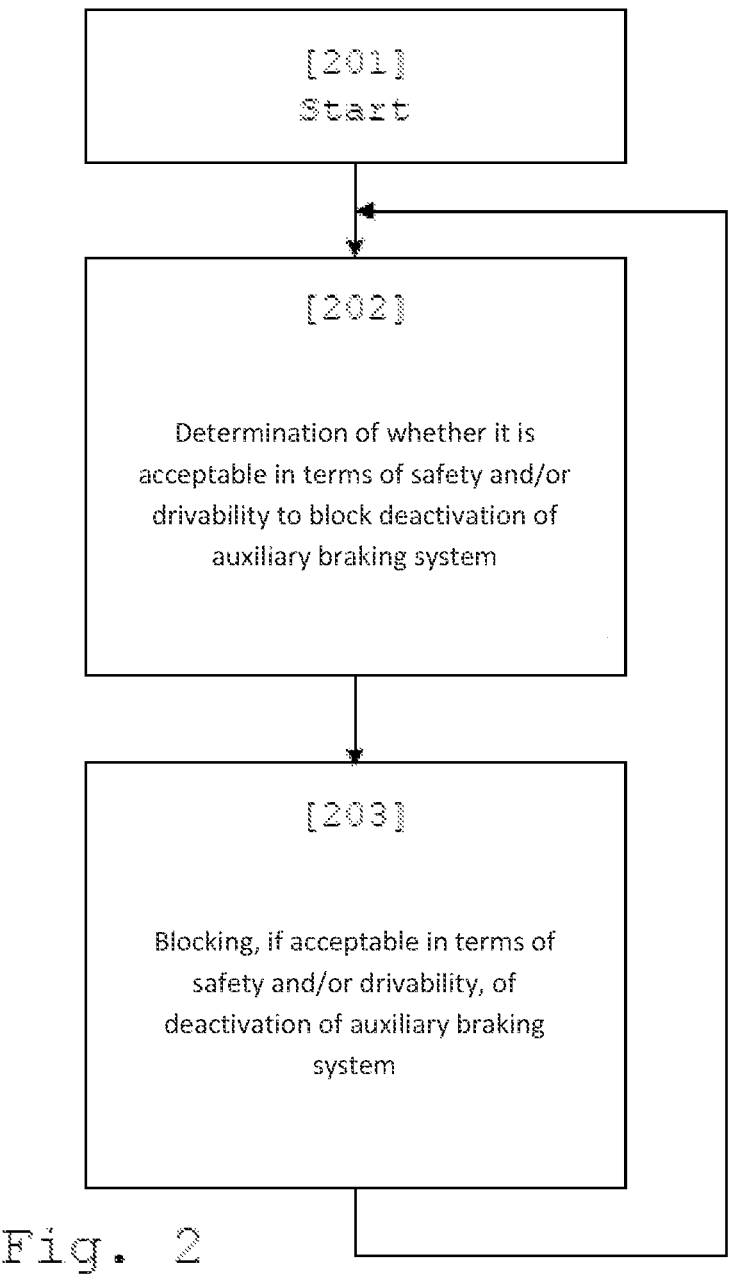
Figure 3:
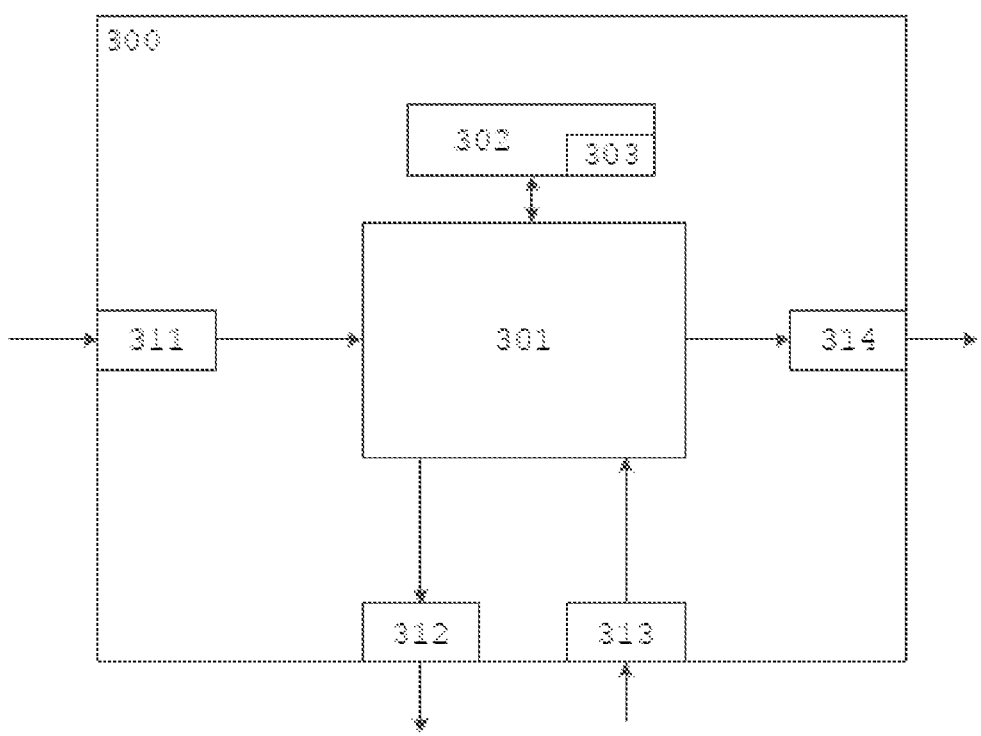

The invention will be illustrated in more detail below, along with the enclosed drawings, where similar references are used for similar parts, and where:

FIG. 1 shows a schematic example vehicle in which the present invention may be implemented, FIG. 2 shows a flow chart for the method according to the present invention, FIG. 3 shows a control device according to the present invention.

DESCRIPTION OF PREFERRED EMBODIMENTS

FIG. 1 schematically shows an example vehicle 100, which may comprise the present invention. The vehicle 100, which may be a passenger car, a truck, a bus or another vehicle, comprises a driveline which conveys power to driving wheels 111, 112 in the vehicle 100. The driveline comprises a combustion engine 101, which in a customary manner, via an output shaft 102 on the combustion engine 101, is connected to a gearbox 103 via a clutch 106. Naturally, the vehicle's driveline may also be of another type, such as a type with a conventional automatic gearbox, of a type with a hybrid driveline, etc. The combustion engine 101 is controlled by the vehicle's control system via a control device 140, which is schematically illustrated in FIG. 1.

An output shaft 107 from the gearbox 103 drives the driving wheels 111, 112 via a final drive 108, such as a customary differential, and drive shafts 104, 105 connected to said final drive 108.

Exhausts generated by the engine 101 during its combustion of fuel are purified by an exhaust treatment system 130 before they are released from the vehicle. The exhaust treatment system 130, which is illustrated very schematically herein, may e.g. comprise one or several of particulate filters, oxidation catalysts and reduction catalysts. The purification of the exhausts is controlled by a control device 140, which controls e.g. the dosage of a reductant, which may comprise or be converted into ammonia, e.g. urea. The control device controlling the exhaust treatment system is schematically illustrated in FIG. 1 as the same control device which controls the combustion engine, but may also be arranged separately from this control device 140.

The vehicle also comprises at least one service brake system 150 schematically illustrated herein, comprising one control device 155, which is illustrated in FIG. 1 as two separate control devices 155 for the front and rear wheels 111, 112, 113, 114, respectively, but which may also consist of a joint control device for the front and rear wheels. The service brake system 150 also comprises one or several service brake devices 151, 152, 153, 154, arranged in connection with two or more of the vehicle's wheels 111, 112, 113, 114. The service brake devices 151, 152, 153, 154 may e.g. consist of disc brakes and/or drum brakes. The service brake devices 151, 152, 153, 154 are controlled by the control device 155, which is illustrated schematically in FIG. 1 as separated from the control device 140 which controls the combustion engine and/or the exhaust treatment system 130. However, the control device 155 for the service brake devices may also be incorporated in the control device 140 which controls the combustion engine and/or the exhaust treatment system 130.

The vehicle also comprises an auxiliary brake system 160 which may act on the driveline, as described above, and which is schematically illustrated as the auxiliary brake device 120 in FIG. 1. This brake device which acts upon the driveline may e.g. consist of a retarder brake and/or an electric machinery connected to the driveline. The auxiliary brake system 160 may also apply braking force by way of impacting the exhaust treatment system 130 and/or the exhaust pipe 131, in which the exhausts are led from the engine to the exhaust purifying devices in the exhaust treatment system 130, i.e. by way of so-called exhaust braking. As mentioned above, in exhaust braking, one or several dampers in the exhaust treatment system are regulated, which means that the exhaust back pressure increases so that an increased braking action is achieved during dragging.

The auxiliary brake system 160 may also apply braking action by way of controlling the engine system 101 as described above, i.e. by way of engine braking. The auxiliary brake system 160 is controlled by an auxiliary brake control device 161 connected to the engine 101, to the auxiliary brake device 120, and to the exhaust treatment system 130. The auxiliary brake control device 161 is schematically illustrated in FIG. 1 as separate from the control device 140 which controls the combustion engine and/or the exhaust treatment system 130. However, the control device 161 for the auxiliary brake system 160 may also be incorporated in the control device 140 which controls the combustion engine and/or the exhaust treatment system 130.

The control device 140 is connected to the engine 101, and to the service brake system 150, to the auxiliary brake system 160 and to the exhaust purification system 130.

The control device 140 may, according to the present invention, comprise a determination device 141 and a blocking device 142, which are described in further detail below.

The vehicle 100 also comprises one or several manual controls 170, 190, which may comprise substantially all types of input devices with which information may be input to the service brake system and/or the auxiliary brake system, e.g. a brake pedal, a brake lever, a brake handle, or a brake button. In FIG. 1, the one or several manual controls are schematically illustrated as two separate devices 170, 190 connected to the control device 140. However, they may also form a joint unit and/or be connected to some other control device in the vehicle, e.g. to a control device for the service brake system 155 or to a control device for the auxiliary brake system 161.

FIG. 2 shows a flow chart for a method according to the present invention.

The method begins at a first step 201.

In a second step 202 of the method it is determined, e.g. with the use of the determination device described below, whether the vehicle 100 is in a driving mode for which it is acceptable in terms of safety and/or drivability to block the deactivation of the braking action for the auxiliary brake system 160 with the system for prevention of wheel lock when braking. In other words, it is thus determined whether it is suitable, from a safety and/or drivability perspective, to block the ABS system for braking action for the auxiliary brake system 160. If a manual control, which is set up solely for the activation of braking action for the auxiliary brake system, is activated and/or has been activated by the driver, this is here interpreted to mean that it is acceptable, from a safety and/or drivability point of view for the driving mode in question, to block the deactivation.

In a third step 203, the determination in the second step 202 is used to determine, e.g. in the blocking device described below, whether a blocking of the deactivation of the braking action for the auxiliary brake system should be carried out. If the determination in the second step shows that it is acceptable, from a safety and/or drivability point of view, to block the deactivation of the braking action for the auxiliary brake system, which may be achieved with the ABS system, such blocking should be carried out according to the present invention.

The determination according to the second step 202 of the method is repeated while a blocking of the deactivation of the braking action for the auxiliary brake system is ongoing, which is illustrated by the arrow from the third step 203 back to the second step 202 in FIG. 2. Thus, the ongoing blocking of the deactivation of the braking action for the auxiliary brake system may be evaluated continuously. The blocking may, in this manner, be maintained precisely as long as it is acceptable in terms of safety and/or drivability, in order to be directly interrupted when the blocking is no longer acceptable in terms of safety and/or drivability. One example of an event, which means that the evaluation/determination during an ongoing blocking of the braking action for the auxiliary brake system shifts from the blocking being deemed acceptable to the blocking being deemed unacceptable, may consist of the driver's input with a second manual control 190 set up for the activation of braking action for the service brake system 150, e.g. in that the driver depresses the brake pedal forcefully.

With the present invention, safe driving on slippery and/or rough roads/surfaces may be ensured since an intelligent blocking of the ABS system with respect to the auxiliary brakes is achieved, which in each situation is based on the suitability, in terms of safety and/or drivability, of carrying out the blocking. Thus, through the present invention, periods without braking action in the vehicle may be avoided, since the ABS system may be blocked in a controlled manner with respect to the auxiliary brakes, if it is deemed suitable.

Avoiding periods without any braking action in the vehicle entails a considerable increase of driver comfort for the vehicle, since the situations which arose in prior art systems and which are stressful for the driver, where the vehicle lacked braking action, may be avoided.

As mentioned above, the system for prevention of wheel lock when braking, i.e. the ABS system, may base deactivation of braking action provided by the auxiliary brake system, and/or the active control of braking action provided by the service brake system, on at least one wheel slip for one or several wheels 111, 112, 113, 114 in the vehicle 100. As mentioned above, a wheel slip is the difference between a measured rotational speed for a wheel and the rotational speed which the wheel should have had if it had rolled with the vehicle without any resistance.

During braking, wheel slips may arise if the friction between a braking wheel and the surface on which the wheel is rolling is less than the braking force which a brake applies to the wheel. Since the auxiliary brakes act on the driving wheels, wheel slips during braking with the auxiliary brake system 160 may be measured by way of a comparison between the rotational speed of the driving wheels, e.g. the rear wheels, and the rotational speed of other wheels in the vehicle that roll freely, e.g. the front wheels. Wheel slips may thus be measured as a percentage of the rotational speed of the front wheels, which may be deemed to constitute the natural rotational speed of the vehicle's wheels, i.e. the rotational speed without a wheel slip.

In case of a wheel slip, the ABS system will, according to its prior art function, request a deactivation of the auxiliary braking and/or will request an active control of the service brakes. In case of an extensive wheel slip, according to prior art systems a warning signal/ABS flag is created on a CAN bus (Controller Area Network bus) in the vehicle 100, which is interpreted to indicate that the auxiliary brake torque should be deactivated/interrupted, i.e. that the auxiliary brake system should be disconnected.

With the use of the present invention, however, this function of the ABS system may be blocked, so that the ABS system may not request disconnection of the auxiliary brakes even if a wheel slip occurs. The vehicle 100 will therefore have a continuous auxiliary braking action, also while driving on e.g. slippery and/or rough surfaces, since the auxiliary braking will not be deactivated by the ABS system. The ABS system, i.e. the system for the prevention of wheel lock when braking, may e.g. be implemented in the control device 140, but may also be implemented in another control device in the vehicle 100, which is in contact with the service brake and/or the auxiliary brake systems.

The determination of whether a driving mode exists, for which it is acceptable in terms of safety and/or drivability, to block the ABS system for the auxiliary brake system may, according to one embodiment of the present invention, be based on at least one input made by a driver.

The driver interface of a vehicle may comprise a number of different types of manual controls 170, 190 set up to receive inputs. A driver of the vehicle, or a passenger or e.g. a garage mechanic, may make inputs by handling such manual controls. In this document, the term inputs comprises substantially all types of handling of the manual controls which may be interpreted by a system and/or by a control device as information to the system and/or the control device.

A driver interface in a vehicle may e.g. be equipped with one or several of the manual controls 170, 190 a brake pedal, a brake lever, a brake handle, a brake button. One or several of these manual controls may thus, according to the present invention, be used to provide the system and/or the control device, according to the present invention, with information on which the determination of whether the ABS system may be blocked with respect to the auxiliary brakes may be based.

The driver may thus easily control the function of the ABS system with the use of these manual controls. This means that the driver's desire to use the system according to the present invention is great, since the driver perceives that (s)he determines the vehicle's behavior. The vehicle may also behave in a manner which is intuitively intelligible to the driver, which contributes to a pleasant driving experience for the driver.

The manual control may, according to one embodiment of the present invention, consist of a first manual control 170, solely being set up for activation of a braking action for the auxiliary brake system. The first manual control may thus comprise an activation control, such as a pushbutton or a lever, set up to activate auxiliary braking, e.g. retarder braking or exhaust braking. Here, the first manual control 170 is thus dedicated for control of auxiliary braking, and may consist of an activation control set up separately for this purpose. According to one embodiment, the first manual control 170 thus does not control the service brakes, i.e. that the first manual control is separate from a second manual control 190 which controls the service brakes. When the first manual control 170, set up solely for activation of auxiliary braking, is activated, such input is interpreted to mean that for the current driving mode it is acceptable in terms of safety and/or drivability to block the deactivation of the braking action for the auxiliary brake system 160 with the system for prevention of wheel lock when braking. In other words, the ABS system's function is blocked if the driver has actively made an input which may be interpreted as though the driver wishes that it should be possible to use auxiliary braking. This provides an intuitively intelligible and correct function for the ABS system which may easily be accepted by a driver, since the function means that the auxiliary braking is always available if the driver him-/herself has made inputs which indicate that auxiliary braking is desirable.

If, however, the driver makes an input with a second manual control set up for activation of the service brake system 150, such an input from the system and/or the control device will, according to one embodiment of the present invention, be interpreted as though it is unacceptable for the current driving mode, in terms of safety and/or drivability, to block the deactivation of the braking action for the auxiliary brake system 160 with the system for prevention of wheel lock when braking. Thus, if the driver e.g. depresses a braking pedal for the service brake system, or activates another input element intended to activate the service brake system 150, it is deemed unsuitable to block the ABS system with regard to the auxiliary braking. This means that the skid-preventing ABS system will be used, e.g. if the driver is forced to brake forcefully. The driver will then depress the service brake pedal, which means the system and/or control device is able to determine that it is important for the ABS system's function to be used, both for the service brake system 150 and the auxiliary brake system 160. Here, the ABS system's function is thus not blocked at all, which ensures safe and skid-free braking when desirable.

In other words, according to this embodiment of the present invention, the ABS system is allowed to control the braking action for both the service brake system 150 and the auxiliary brake system 160 in order to achieve a maximum braking action without skidding, if e.g. the service brake pedal is depressed by the driver, even if the first manual control 170, which is set up solely for activation of braking action for the auxiliary brake system, is activated. This may also be expressed as though the system/control device according to the present invention is arranged to ignore the ABS system's signalling intended for the auxiliary brake system, if the first manual control 170 for the auxiliary brake system is activated, until the driver uses the second manual control, e.g. a service brake pedal, set up for activation of the service brake system 150. After the second manual control 190 set up for activation of the service brake system has been activated by the driver, the system/control device begins, according to the present invention, to listen to the ABS system's signalling intended for the auxiliary brake system again, since the vehicle is then deemed to be in a sensitive and/or safety-critical situation.

Therefore, the driver is allowed to assess whether there is a risk of skidding and/or wheel lock, as long as the second manual control 190 set up for activation of the service brake system is not activated. However, if the second manual control 190 set up for activation of the service brake system is activated, e.g. because the driver depresses the service brake pedal, the ABS system takes over the assessment of the risk of skidding and/or wheel lock for the vehicle.

According to one embodiment of the present invention, an input with a second manual control 190, set up for the activation of braking action for the service brake system 150, e.g. a depressing of a service brake pedal, is interpreted as an automatic activation of braking action of the auxiliary brake system 160. Such an automatic activation should then result in the deactivation of the braking action provided by the auxiliary brake system being permitted. In other words, the ABS system will not be blocked at all if such an automatic activation of the auxiliary system 160 occurs, so that ABS system supported braking, and thus substantially skid-free braking, is ensured when the service brake system 150 is activated with the second manual control 190.

According to one embodiment of the present invention, the determination of whether the vehicle 100 is in a driving mode for which it is acceptable in terms of safety and/or drivability to block the ABS system for the auxiliary brake system 160 is based on at least one indication from a cruise control in the vehicle.

Many vehicles today are equipped with a cruise control. There is a large number of different types of cruise controls, of which e.g. certain cruise controls are set up to maintain a substantially constant actual speed $v_{act}$ for the vehicle, some are set up to vary the actual speed $v_{act}$ within a given speed interval to minimise fuel consumption, and some are set up, e.g. with the use of radar, to maintain a substantially constant distance to the vehicle in front. Thus, cruise controls, apart from controlling the torque requested from the engine, may also control the service brake system 150, and/or the auxiliary brake system 160, in order to achieve e.g. a constant speed or a constant distance to other vehicles. Cruise controls which achieve a constant speed by way of braking when travelling on downhill slopes are sometimes called constant speed brake systems. The cruise control may e.g. be implemented in the control device 140, or may be implemented in another control device in the vehicle, which is in contact with the engine 101 and/or the brake systems 150, 160.

If the cruise control indicates to the system according to the present invention that the service brake system is activated, this indication is interpreted as though it is unacceptable in terms of safety and/or drivability for the current driving mode to block the deactivation of braking action for the auxiliary brake system 160 with the ABS system. Thus, braking initiated by the cruise control is interpreted in the same manner as manual braking with the service brake, i.e. as though the ABS system should not be blocked when such cruise control initiated braking occurs. In the same manner as for the service braking with the manual controls, this embodiment of the invention provides safe and skid-free cruise control functions.

According to one embodiment of the present invention, blocking of the deactivation of braking action for the auxiliary brake system 160, i.e. the blocking of the ABS system with respect to the auxiliary brake system 160, is controlled based on at least one configuration parameter for a control system in the vehicle 100. In other words, the control of the ABS system is, according to the present invention, based on at least one configuration parameter in the software of the control system. Here, an indication in a driver interface in the vehicle may be used to indicate whether the deactivation of braking action for the auxiliary brake system 160 will be blocked.

According to one embodiment of the present invention, the system therefore comprises an indicator 180, which in a driver interface 180 in the vehicle 100 indicates that the control according to the present invention is carried out. When the engine 101 of the vehicle is started and/or while driving, the indicator 180 may indicate in some manner, e.g. by way a symbol, a word, a letter, or one or several digits glowing continuously or blinking in some colour, that the ABS function is blocked for the auxiliary brakes, if this is the case. Thereby, the driver is always notified of how the vehicle is configured with respect to the ABS function for the auxiliary brake system 160, so that safe driving of the vehicle may be provided. Additionally, the vehicle will behave as the driver expects, which increases both the driver's comfort and the driver's desire to use the invention.

As a person skilled in the art will realize, substantially any type of indication, e.g. an acoustic indication, may also be used to notify the driver that the ABS function is blocked, if this is the case.

A person skilled in the art will also realize that a method for control of an auxiliary brake system 160, according to the present invention, may also be implemented in a computer program, which when executed in a computer will cause the computer to carry out the method. The computer program usually consists of a part of a computer program product 303, where the computer program product comprises a suitable digital storage medium on which the computer program is stored. Said computer-readable medium consists of a suitable memory, e.g.: ROM (Read-Only Memory), PROM (Programmable Read-Only Memory), EPROM (Erasable PROM), Flash, EEPROM (Electrically Erasable PROM), a hard disk device, etc.

FIG. 3 schematically shows a control device 300. The control device 300 comprises a calculation device 301, which may consist of essentially a suitable type of processor or microcomputer, e.g. a circuit for digital signal processing (Digital Signal Processor, DSP), or a circuit with a predetermined specific function (Application Specific Integrated Circuit, ASIC). The calculation device 301 is connected to a memory unit 302 installed in the control device 300, providing the calculation device 301 with e.g. the stored program code and/or the stored data which the calculation device 301 needs in order to be able to carry out calculations. The calculation device 301 is also set up to store interim or final results of calculations in the memory device 302.

Further, the control device 300 is equipped with devices 311, 312, 313, 314 for receipt and sending of input and output signals, respectively. These input and output signals may contain wave shapes, pulses or other attributes, which may be detected as information by the devices 311, 313 for the receipt of input signals and may be converted into signals that may be processed by the calculation device 301. These signals are then provided to the calculation device 301. The devices 312, 314 for sending output signals are arranged to convert the calculation result from the calculation unit 301 into output signals for transfer to other parts of the vehicle's control system, and/or the component(s) for which the signals are intended.

Each one of the connections to the devices for receiving and sending of input and output signals may consist of one or several of a cable; a data bus, such as a CAN (Controller Area Network) bus, a MOST (Media Oriented Systems Transport) bus, or any other bus configuration; or of a wireless connection. The connections between the control devices 140, 155, 161 and between these control devices and the engine 101, the exhaust treatment system 130, the service brake devices 151, 152, 153, 154, or the auxiliary brake device 120 displayed in FIG. 1 may thus consist of one or several of these cables, buses or wireless connections.

A person skilled in the art will realize that the above-mentioned computer may consist of the calculation device 301, and that the above-mentioned memory may consist of the memory device 302.

Generally, control systems in modern vehicles consist of a communications bus system, consisting of one or several communications buses to connect a number of electronic control devices (ECUs), or controllers, and different components localised on the vehicle. Such a control system may comprise a large number of control devices, and the responsibility for a specific function may be distributed among more than one control device. Vehicles of the type shown thus often comprise significantly more control devices than what is shown in FIG. 3, which is well known to a person skilled in the art within the technology area.

The present invention, in the embodiment displayed, is implemented in the control device 300. The invention may, however, also be implemented wholly or partly in one or several other control devices already existing in the vehicle or in a control device dedicated to the present invention.

According to one aspect of the present invention, a system arranged to control an auxiliary brake system 160 in a vehicle 100 is provided, where the vehicle 100 comprises the above described auxiliary brake system 160, the service brake system 150 and the system for prevention of wheel lock when braking. The system for prevention of wheel lock when braking is arranged to be able to deactivate a braking action provided via the auxiliary brake system 160 and to actively be able to control a braking action provided via the service brake system 150.

According to the present invention, the system for control of the auxiliary brake system 160 comprises a determination device 141, which is arranged for the determination of whether the vehicle is in a driving mode for which it is acceptable in terms of safety and/or drivability to block the deactivation of braking action for the auxiliary brake system 160 by using the system for prevention of wheel lock when braking. Thus, the determination device is arranged to determine whether or not it is suitable to apply the ABS function to the auxiliary brake system 160. Such determination may, in the manner described above, base the determination on a number of different parameters. If a manual control 170, set up solely for the activation of braking action for the auxiliary brake system 160, is activated and/or has been activated in the vehicle, e.g. by the driver, this is here interpreted to mean that it is acceptable, from a safety and/or drivability point of view for the driving mode in question, to block the deactivation.

The system for control of the auxiliary brake system 160 also comprises a blocking device 142, arranged to carry out a blocking of the deactivation of braking action for the auxiliary brake system 160, if the determination, which is carried out by the determination device 141, shows that it is acceptable in terms of safety and/or drivability to carry out the blocking. The blocking device 142 thus blocks the ABS function for the auxiliary brake system 160 if it is deemed suitable/acceptable, in the manner described above.

With the present invention, safe driving on slippery and/or rough roads/surfaces may be ensured, since an intelligent blocking of the ABS system with respect to the auxiliary brakes is achieved, which in each situation is based on the suitability, in terms of safety and/or drivability, of carrying out the blocking.

The system for the control of the auxiliary brake system 160 may be set up so that the determination device 141 is arranged to base the determination on at least one input made by a driver, where said input is received by one or several manual controls 170, 190 comprising one or several of a brake pedal, a brake lever, a brake handle or a brake button.

The system for the control of the auxiliary brake system 160 may also comprise an indicator 180, arranged in a driver interface in the vehicle 100 and being arranged to indicate whether or not said blocking of the deactivation of braking action for the auxiliary brake system 160 will take place.

The system according to the present invention may be arranged to carry out all of the method embodiments described above and in the claims, wherein the system for the respective embodiment achieves the above described advantages for the respective embodiment.

A person skilled in the art will also realize that the above system may be modified according to the different embodiments of the method according to the invention. In addition, the invention pertains to a motor vehicle 100, e.g. a truck or a bus, comprising at least one system for the control of an auxiliary brake system.

The present invention is not limited to the embodiments of the invention described above, but pertains to and comprises all embodiments within the protected scope of the enclosed independent claims.

The invention claimed is:

1. A method for control of an auxiliary brake system in a vehicle, wherein the vehicle includes an auxiliary brake system configured for braking the vehicle not by direct braking of wheels of the vehicle, a service brake system configured for directly braking of wheels of the vehicle and a system for prevention of wheel lock when braking the vehicle, wherein the system for the prevention of wheel lock is configured to deactivate a braking action provided by the auxiliary brake system, the method comprising:

determining whether the vehicle is in a driving mode in which it is acceptable in terms of at least one of safety and drivability of the vehicle to block deactivation of the braking action of the auxiliary brake system through the system for prevention of wheel lock when braking, wherein the determining is based on at least a first input made by a driver of the vehicle through a first manual control, set up solely for activation of the braking action of the auxiliary brake system, and wherein an activation of the first manual control is interpreted as though it is acceptable in terms of at least one of safety and drivability for the driving mode to block the deactivation of the braking action of the auxiliary brake system; and if the determination shows that it is acceptable in terms of at least one of safety and drivability, blocking of the deactivation of the braking action of the auxiliary brake system.

2. A method according to claim 1, further comprising a second input with a second manual control configured for activating the braking action of the service brake system, and wherein the second input is configured to be interpreted as though it is unacceptable in terms of at least one of safety and drivability for the driving mode of the vehicle to block the deactivation of the braking action for the auxiliary brake system through the system for prevention of wheel lock when braking.

3. A method according to claim 1, further comprising a second input with a second manual control, configured for activating the braking action of the service brake system, and wherein the activation of the braking action of the service brake system is interpreted as an automatic activation of the braking action of the auxiliary brake system.

4. A method according to claim 1, wherein the system for preventing of wheel lock when braking the vehicle bases the deactivation of the braking action provided by the auxiliary brake system and the active control of the braking action provided by the service brake system on at least one wheel slip of one or several of the wheels of the vehicle.

5. A method according to claim 1, further comprising: controlling the blocking of the deactivation of the braking action of the auxiliary brake system is based on at least one configuration parameter for a control system in the vehicle.

6. A method according to claim 1, wherein the determination is based on at least one indication from a cruise control in the vehicle.

7. A method according to claim 6, wherein, if the at least one indication pertains to an activation of the braking action for the service brake system, interpreting the indication as though it is unacceptable in terms of at least one of safety and drivability for the driving mode of the vehicle to block the deactivation of the braking action for the auxiliary brake system through the system for preventing a wheel lock when braking the vehicle.

8. A method according to claim 1, wherein the system for prevention of wheel lock when braking the vehicle is configured to actively control a braking action provided by the service brake system.

9. A method according to claim 1, wherein the service brake system is configured to brake wheels of the vehicle and the auxiliary brake system brakes the vehicle by operating other components of the vehicle which operation causes braking of the vehicle.

10. A computer program product comprising a non-transitory computer-readable medium and a computer program stored on the medium, the computer program comprising a program code, which when the program code is executed in a computer, causes the computer to carry out the method according to claim 1.

11. A system configured for controlling an auxiliary brake system in a vehicle, comprising:

the auxiliary brake system configured for braking the vehicle not by direct braking of wheels of the vehicle, a service brake system configured for acting on wheels of the vehicle for braking the vehicle and a system for preventing wheel lock when braking the vehicle;

wherein the system for preventing wheel lock when braking is configured to deactivate a braking action provided by the auxiliary brake system, and to also actively control a braking action provided by the service brake system;

a determination device configured to determine whether the vehicle is in a driving mode in which it is acceptable in terms of at least one of safety and drivability to block the deactivation of the braking action of the auxiliary brake system through the system for preventing wheel lock when braking, the determination device is configured to base the determination on at least a first input that is made by a driver of the vehicle through a first manual control, configured solely for the activation of the braking action of the auxiliary brake system, and the determination device is configured such that activation of the first manual control is interpreted and the determination device is configured to interpret the activation of the first manual control as though for a driving mode then in use, it is acceptable in terms of at least one of safety and drivability to block the deactivation of the braking action of the auxiliary brake system; and a blocking device configured for blocking of the deactivation of the braking action of the auxiliary brake system if the determination by the determination device shows that the deactivation of the braking system is acceptable in terms of at least one of safety and drivability.

12. A system according to claim 11, wherein at least one of the first and manual controls comprises at least one or several of the group consisting of:

a brake pedal;
a brake lever;
a brake handle; and
a brake button.

13. A system according to claim 11, wherein the auxiliary brake system is configured to act on a driveline in the vehicle.

14. A system according to claim 11, wherein the auxiliary brake system comprises at least one or several brakes selected from the group consisting of:

a retarder brake;
an exhaust brake;
an engine brake;
an electric machinery brake comprised in a driveline in the vehicle; and
a braking device which acts on a driveline in the vehicle.

15. A system according to 14, wherein the service brake system comprises at least one or more from the group consisting of:

a disc brake for the wheels; and
a drum brake for the wheels.

16. A system according to claim 11, comprising an indicator in a driver interface in the vehicle, wherein the indicator is configured to indicate whether the blocking of the deactivation of the braking action for the auxiliary brake system will take place.

\* \* \* \* \*